United States Patent
Sinico et al.

(10) Patent No.: US 10,938,267 B2
(45) Date of Patent: Mar. 2, 2021

(54) CENTRIFUGAL ELECTRIC PUMP ASSEMBLY WITH AXIALLY OFFSET ELECTRIC TERMINAL STRIP COMPARTMENT AND FACILITATED PUMP BODY FIXING

(71) Applicant: DAB PUMPS S.P.A., Mestrino (IT)

(72) Inventors: Francesco Sinico, Montecchio Maggiore (IT); Stefano Tazioli, Rosignano Marittimo (IT)

(73) Assignee: DAB PUMPS S.P.A., Mestrino (IT)

( * ) Notice: Subject to any disclaimer, the term of this patent is extended or adjusted under 35 U.S.C. 154(b) by 8 days.

(21) Appl. No.: 16/282,857

(22) Filed: Feb. 22, 2019

(65) Prior Publication Data

US 2019/0267866 A1 Aug. 29, 2019

(30) Foreign Application Priority Data

Feb. 27, 2018 (IT) .......................... 102018000003060

(51) Int. Cl.
*H02K 11/33* (2016.01)
*H02K 7/18* (2006.01)
(Continued)

(52) U.S. Cl.
CPC ............. *H02K 5/225* (2013.01); *F04D 13/06* (2013.01); *F04D 13/0686* (2013.01);
(Continued)

(58) Field of Classification Search
CPC ........ H02K 5/22; H02K 11/33; H02K 7/1823; H02K 7/18
(Continued)

(56) References Cited

U.S. PATENT DOCUMENTS

2003/0099072 A1\* 5/2003 Marioni ................. H02K 5/225
361/23
2014/0050603 A1\* 2/2014 Hoj ........................ F04D 29/426
417/410.1
(Continued)

FOREIGN PATENT DOCUMENTS

EP 1315271 A2 5/2003
EP 2781758 A1 9/2014
KR 100909663 B1 7/2009

OTHER PUBLICATIONS

IT Search Report dated Nov. 2, 2018 re: Application No. 102018000003060, pp. 1-7, citing: EP 1 315 271 A2, KR 100 909 663 B1 and EP 2 781 758 A1.

*Primary Examiner* — Jose A Gonzalez Quinones
(74) *Attorney, Agent, or Firm* — Cantor Colburn LLP

(57) ABSTRACT

A centrifugal electric pump assembly includes a pump body formed by a volute and an intake duct and a delivery duct. The pump also includes an electric motor, contained in an accommodation casing, the casing facing with one of its ends the pump body and being fixed to the pump body by means of a plurality of fixing elements; and an electrical box, the electrical box facing the other end of the casing. The casing and the electrical box are contained at least partially within a single shell. The pump further includes a terminal strip, connected to the electrical box and arranged in a compartment which extends from the shell, the compartment being axially offset with respect to the direction of extension of the electric pump. The assembly has at least one hole which passes at least partially through the compartment and/or the shell, the hole being extended in the same direction as a corresponding element for fixing the casing to the pump body.

10 Claims, 3 Drawing Sheets

(51) Int. Cl.
    *H02K 5/22*           (2006.01)
    *F04D 25/06*         (2006.01)
    *F04D 29/42*         (2006.01)
    *F04D 13/06*         (2006.01)
    *F04D 29/62*         (2006.01)

(52) U.S. Cl.
    CPC ........... *F04D 25/06* (2013.01); *F04D 29/426* (2013.01); *F04D 29/628* (2013.01)

(58) Field of Classification Search
    USPC .............................................. 310/62, 63, 71
    See application file for complete search history.

(56) References Cited

U.S. PATENT DOCUMENTS

2014/0354088 A1* 12/2014 Kannegaard Andersen ................ H02K 5/128
                                                                                                310/52
2017/0302125 A1* 10/2017 Han ....................... H02K 11/33

* cited by examiner

CENTRIFUGAL ELECTRIC PUMP ASSEMBLY WITH AXIALLY OFFSET ELECTRIC TERMINAL STRIP COMPARTMENT AND FACILITATED PUMP BODY FIXING

CROSS-REFERENCE TO RELATED APPLICATIONS

This application is related to and claims the benefit of Italian Patent Application No. 102018000003060, filed on Feb. 27, 2018, the contents of which are herein incorporated by reference in their entirety.

TECHNICAL FIELD

The present disclosure relates to a centrifugal electric pump assembly with axially offset electric terminal strip compartment and facilitated pump body fixing.

BACKGROUND

Electric pumps normally comprise an electric motor for the actuation of one or more impellers.

The electric motor is powered and controlled by an electrical box, which contains the electronics required for the correct operation of the electric pump.

The electrical box is connected to a power supply cable via an electrical terminal strip.

In some electric pump models, due to manufacturing requirements, the electrical terminal strip is arranged inside a compartment that is axially offset with respect to the axis of direction of the extension of the motor.

However, these known methods have drawbacks.

In some cases, the compartment of the terminal strip has dimensions that are not negligible with respect to the dimensions of the pump body.

Screws are normally used in order to be able to fix the motor accommodation casing to the pump body.

The maneuvering space for the insertion of the screws between the axially offset terminal strip compartment and the pump body can be tight, and accordingly the operation for fixing the motor casing to the pump body can be complicated and awkward.

SUMMARY

The aim of the present disclosure is to provide a centrifugal electric pump assembly with axially offset terminal strip compartment that is capable of improving the background art in one or more of the aspects indicated above.

Within this aim, the disclosure provides a centrifugal electric pump assembly with axially offset terminal strip compartment that allows easy fixing of the motor casing to the pump body.

The disclosure provides a centrifugal electric pump assembly with axially offset terminal strip compartment that allows to remove the motor casing easily from the pump body, if required.

Furthermore, the present disclosure is to overcome the drawbacks of the background art in a manner that is alternative to any existing solutions.

The disclosure provides a centrifugal electric pump assembly with axially offset terminal strip compartment that is highly reliable, relatively easy to provide and at competitive costs.

This aim, as well as these and other advantages which will become better apparent hereinafter, are achieved by providing a centrifugal electric pump assembly, comprising: a pump body formed by a volute and an intake duct and a delivery duct; an electric motor, contained in an accommodation casing, said casing facing with one of its ends said pump body and being fixed to said pump body by means of a plurality of fixing elements; an electrical box, said electrical box facing the other end of said casing; said casing and said electrical box being contained at least partially within a single shell; and a terminal strip, which is connected to said electrical box and is arranged in a compartment which extends from said shell, said compartment being axially offset with respect to the direction of extension of the electric pump, characterized in that it has at least one hole which passes at least partially through said compartment and/or said shell, said hole being extended in the same direction as a corresponding element for fixing said casing to said pump body.

BRIEF DESCRIPTION OF THE DRAWINGS

Further characteristics and advantages of the disclosure will become better apparent from the description of a preferred but not exclusive embodiment of the centrifugal electric pump assembly with axially offset terminal strip compartment according to the disclosure, illustrated by way of nonlimiting example in the accompanying drawings, wherein.

DETAILED DESCRIPTION OF THE DRAWINGS

Figure 1:
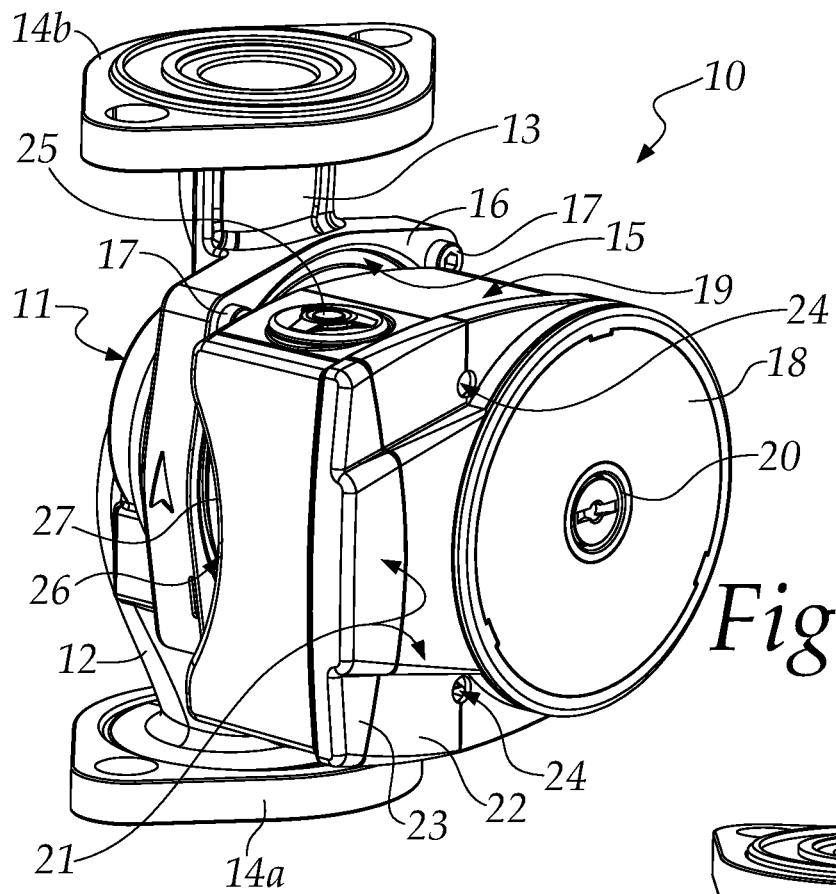
FIG. 1 is a perspective view of a centrifugal electric pump assembly according to the disclosure.
Figure 2:
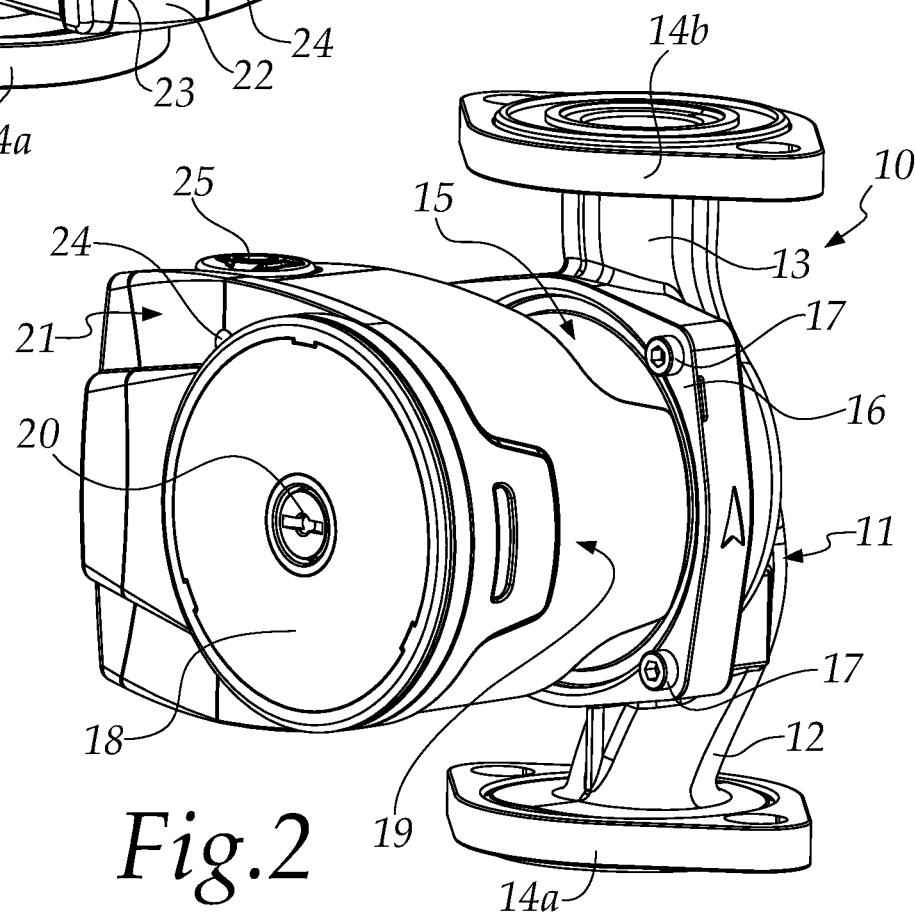
FIG. 2 is a different perspective view of the electric pump assembly of FIG. 1.
Figure 3:
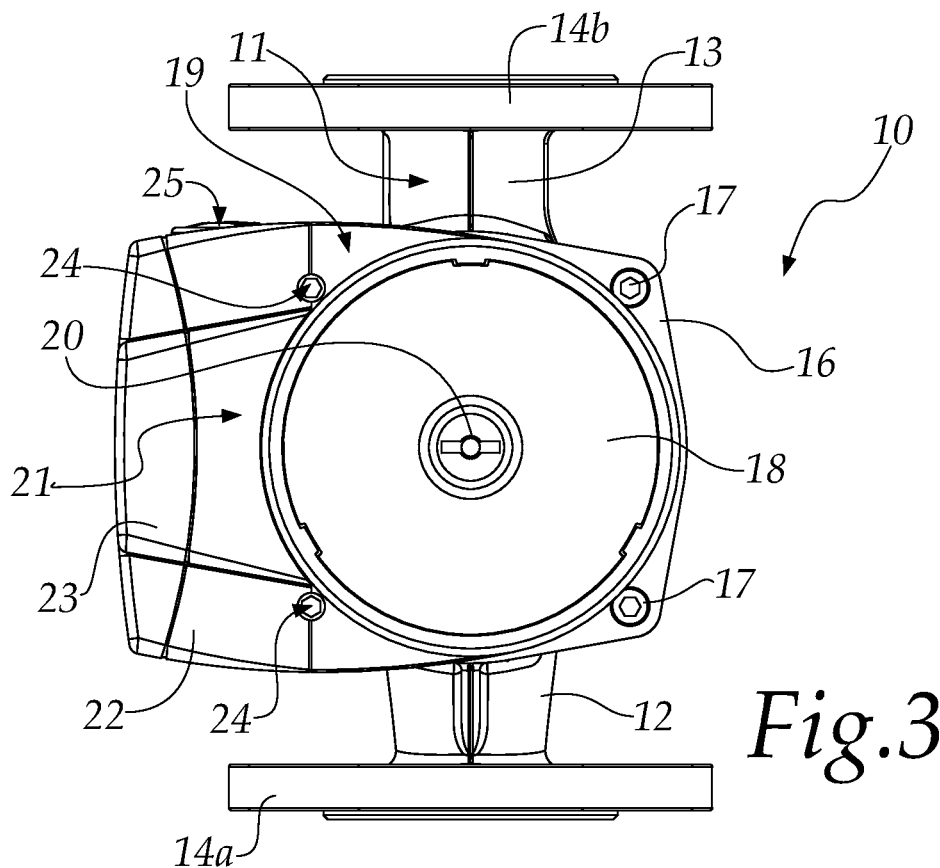
FIG. 3 is a front view of the pump assembly of FIG. 1.
Figure 4:
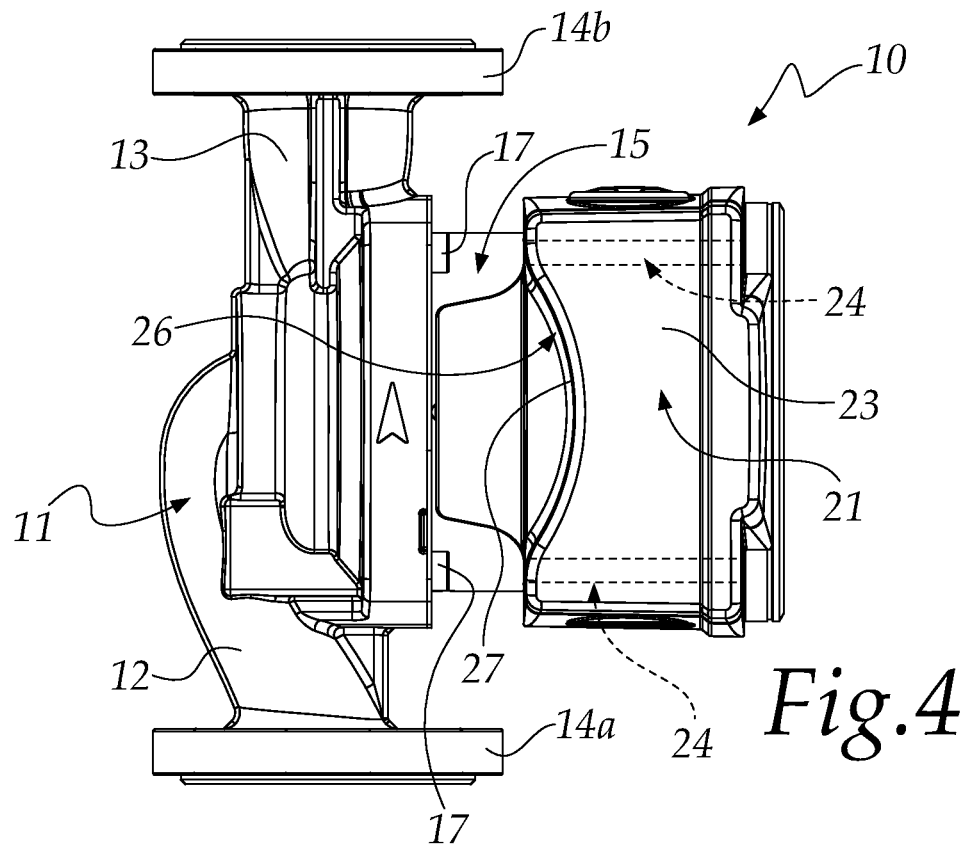
FIG. 4 is a side view of the pump assembly of FIG. 1.
Figure 5:
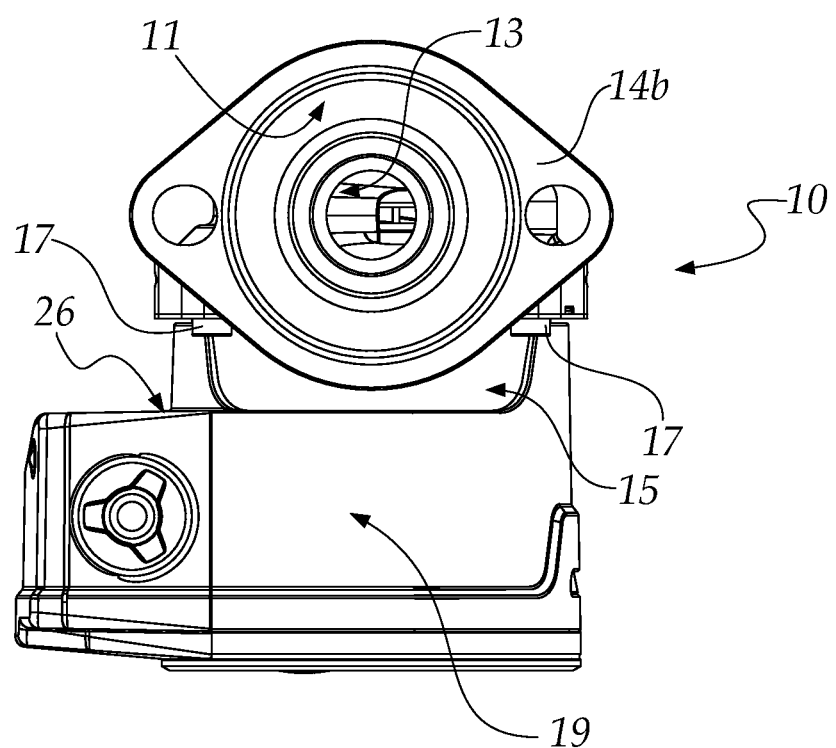
FIG. 5 is a top view of the pump assembly of FIG. 1.

With reference to FIGS. 1-5, a centrifugal electric pump assembly according to the disclosure is generally designated by the reference numeral 10.

The assembly 10 comprises a pump body 11 that is formed by a volute and an intake duct 12 and a delivery duct 13 and contains a wet section.

In particular, the intake duct 12 and the delivery duct 13 each have an end flange, respectively 14a and 14b for connection to the system, monolithically with the respective duct.

The assembly 10 comprises an electric motor, not shown in the figures, for the movement of one or more impellers, also not shown in the figures; the motor is contained in an accommodation casing 15, which is cylindrical and faces the pump body 11.

The casing 15 is connected to the pump body 11 by means of an end flange 16, monolithically with said casing 15.

The end flange 16 of the casing 15 is associated with the pump body 11 by means of a plurality of fixing elements 17, such as for example screws, proximate to its external perimeter.

At the opposite end of the casing 15 with respect to the one provided with the flange 16, there is an electrical box 18, which faces the casing 15 and contains the electronics required for the correct operation of the electric pump.

The electrical box 18 has a cylindrical shape with a circumference that is comparable to the circumference of the casing 15.

The box 18 has a tubular body, not shown in the figures, with an axis of extension that coincides with the axis of extension of the box 18 and with the rotation axis of the electric motor described above.

The tubular body is adapted for the insertion of a plug 20 for access to the wet section.

The casing 15 and the box 18 have the same axis of extension and are contained at least partially within a single shell 19.

The electric pump assembly 10 comprises a terminal strip, not shown in the figures, which is connected to the box 18 for electrical connection to the terminals of the electronics contained in said box 18.

In particular, the terminal strip is contained in a compartment 21 which extends from the lateral edge of the shell 19 and is axially offset with respect to the axis of extension of the electric pump.

The compartment 21 is constituted by a tray 22, the base of which faces the shell 19; said tray is closed by a lid 23 in a manner that is reversible in order to allow access to the terminal strip if needed.

A particularity of the disclosure relates to the presence of at least one through hole 24, which passes at least partially through the shell 19 and/or the compartment 21.

The at least one hole 24 extends in the same direction as a corresponding element 17 for fixing the flange 16 of the casing 15 to the pump body 11.

The at least one hole 24 is adapted for the insertion and passage of a tool, such as for example a screwdriver, or of its tip, for the removal of the fixing elements 17.

In this manner it is possible to remove the fixing elements 17 more easily.

The compartment 21 has at least one portion 25 for coupling to an electric cable carrying tube, not shown in the figures, for the power supply of the electric pump.

Another particularity of the disclosure resides in the fact that the surface 26 of the compartment 21 that is directed toward the pump body 11 is provided with a recess 27.

The recess 27 on the surface 26 has such a shape that allows to rotate completely the electromechanical assembly constituted by the shell 19 and by the compartment 21 and by their content with respect to the pump body 11 without causing interference with the end flanges 14a and 14b of the intake duct 12 and delivery duct 13.

This allows easier and faster maintenance and a plurality of installation solutions.

In practice it has been found that the disclosure achieves the intended aims and advantages, providing a centrifugal electric pump assembly, comprising: a pump body formed by a volute and an intake duct and a delivery duct; an electric motor, contained in an accommodation casing, the casing facing with one of its ends said pump body and being fixed to the pump body by means of a plurality of fixing elements; an electrical box, the electrical box facing the other end of said casing; the casing and the box being contained at least partially within a single shell; and a terminal strip, which is connected to the electrical box and is arranged in a compartment which extends from the shell, the compartment being axially offset with respect to the direction of extension of the electric pump, characterized in that it has at least one hole which passes at least partially through the compartment and/or the shell, the hole being extended in the same direction as a corresponding element for fixing the casing to said pump body.

The disclosure thus conceived is susceptible of numerous modifications and variations, all of which are within the scope of the appended claims; all the details may further be replaced with other technically equivalent elements.

In practice, the materials used, so long as they are compatible with the specific use, as well as the contingent shapes and dimensions, may be any according to the requirements and the state of the art.

What is claimed is:

1. A centrifugal electric pump assembly comprising: a pump body formed by a volute and an intake duct and a delivery duct; an electric motor, contained in an accommodation casing, said casing facing with one of its ends said pump body and being fixed to said pump body by means of a plurality of fixing elements; an electrical box, said electrical box facing another end of said casing; said casing and said electrical box being contained at least partially within a single shell; and a terminal strip connected to said electrical box and arranged in a compartment extending from said shell, said compartment being axially offset with respect to the direction of extension of the electric pump, and further comprising at least one hole which passes at least partially through said compartment and/or said shell, said hole being extended in a same direction as a corresponding element for fixing said casing to said pump body, said hole configured for insertion of and passage of at least a part of a tool configured for removing the fixing elements.

2. The assembly according to claim 1, wherein said compartment comprises a surface directed toward said pump body and is provided with a recess.

3. The assembly according to claim 2, wherein said recess has a shape configured to cause no interference with said pump body during a rotation of an electromechanical unit, constituted by said shell and said compartment and by their content, with respect to said pump body.

4. The assembly according to claim 1, wherein said compartment is constituted by a tray, a base of which faces said shell, closed by a lid, in a reversible manner.

5. The assembly according to claim 1, wherein said casing for accommodating said electric motor has a cylindrical shape.

6. The assembly according to claim 1, wherein said electrical box has a cylindrical shape with a circumference that can be compared with a circumference of said casing.

7. The assembly according to claim 1, wherein said electrical box and said casing have a same axis of extension.

8. The assembly according to claim 1, wherein said casing has an axis of extension which coincides with a rotation axis of said electric motor.

9. The assembly according to claim 1, wherein said compartment has at least one portion for coupling to an electric cable carrying tube for a power supply of the electric pump.

10. The assembly according to claim 1, wherein said box has a tubular body, with an axis of extension that coincides with an axis of extension of said box, adapted for the insertion of a plug.

* * * * *